(12) United States Patent
Smolk et al.

(10) Patent No.: US 10,078,816 B2
(45) Date of Patent: Sep. 18, 2018

(54) AUTOMATED TRANSACTION MACHINE WITH SHUTTLE

(71) Applicant: Diebold, Incorporated, North Canton, OH (US)

(72) Inventors: Jasen James Smolk, Ravenna, OH (US); Jeffrey M. Eastman, North Canton, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 245 days.

(21) Appl. No.: 15/179,304

(22) Filed: Jun. 10, 2016

(65) Prior Publication Data

US 2016/0364706 A1    Dec. 15, 2016

Related U.S. Application Data

(60) Provisional application No. 62/175,001, filed on Jun. 12, 2015.

(51) Int. Cl.
*G07D 11/00*  (2006.01)
*G07F 19/00*  (2006.01)
*G06Q 10/10*  (2012.01)

(52) U.S. Cl.
CPC ........... *G06Q 10/10* (2013.01); *G07F 19/201* (2013.01); *G07F 19/202* (2013.01); *G07F 19/203* (2013.01)

(58) Field of Classification Search
CPC ................................. G07D 11/00; G07F 19/00
USPC ........................................................... 235/379
See application file for complete search history.

(56) References Cited

U.S. PATENT DOCUMENTS

| 7,658,320 B1 | 2/2010 | Lute et al. |
| 2002/0060421 A1 | 5/2002 | Kako et al. |
| 2013/0075467 A1 | 3/2013 | Graef et al. |

FOREIGN PATENT DOCUMENTS

| EP | 0965956 A2 | 12/1999 |
| EP | 2874129 A1 | 5/2015 |

OTHER PUBLICATIONS

International Search Report and Written Opinion of the International Searching Authority for corresponding PCT application No. PCT/US2016/036949; dated Sep. 2, 2016.

*Primary Examiner* — Daniel Hess
(74) *Attorney, Agent, or Firm* — Black, McCuskey, Souers & Arbaugh, LPA

(57) ABSTRACT

A document delivery system within an automated transaction machine includes a shuttle for receiving a stack of documents. The shuttle is moveable from a dock location to a user interface location along a track system The shuttle may be utilized with a rear-load configuration or a front-load configuration in which the track system has a travel path from the dock location to the user interface location.

20 Claims, 14 Drawing Sheets

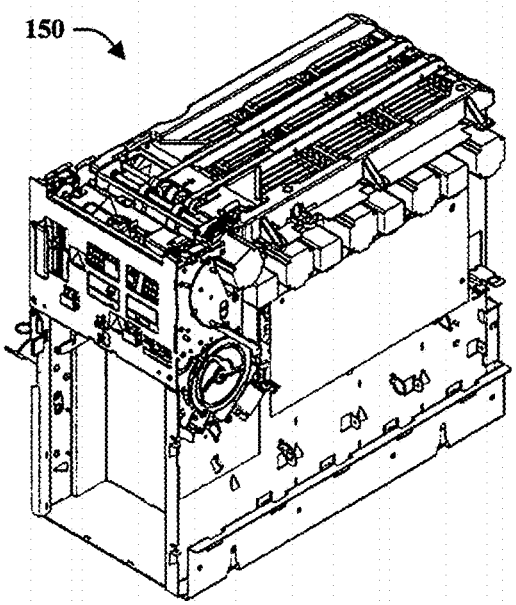 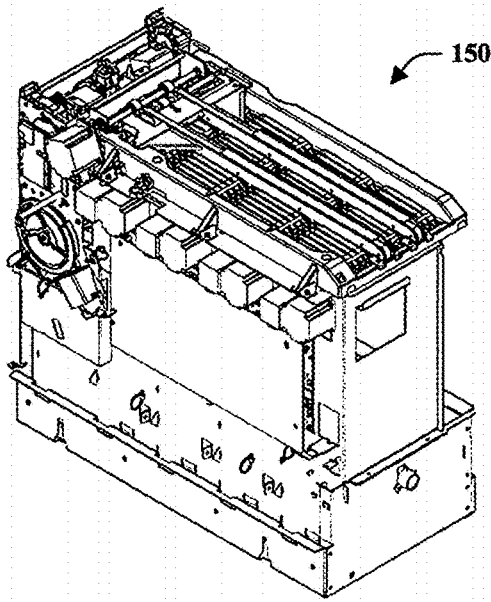
FIG. 13  FIG. 14
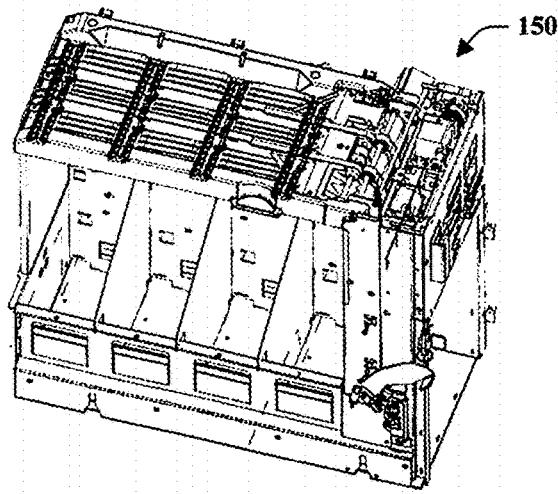
FIG. 15

AUTOMATED TRANSACTION MACHINE WITH SHUTTLE

CROSS-REFERENCE TO RELATED APPLICATIONS

This application claims priority to and the benefit of U.S. Provisional Patent Application No. 62/175,001 filed 12 Jun. 2015, the contents of which are hereby incorporated by reference in their entirety.

BACKGROUND

This relates in general to Automated Transaction Machines (ATMs) and systems for automated financial or commercial transactions, sometimes known as an Automated Banking Machine or Automated Teller Machine.

Automated Transaction Machines are commonly used to carry out a variety of financial or commercial transactions. Most commonly, these transactions include dispensing cash, checking account balances, paying bills and/or receiving deposits from users. ATMs may also perform a variety of other transactions, including the sale and purchase of tickets, issuance of coupons, check or voucher presentation, the printing of script and a variety of other functions.

In carrying out these transactions or performing these functions, a variety of documents may be moved through the Automated Transaction Machine. Sometimes a jam, misfeed or other error may occur in the conveyance of such documents.

SUMMARY

An automated transaction machine includes a cartridge that stores a document; a first document delivery system that transports the document from the cartridge to a document analysis area via a first transport path; a second document delivery system that transports the document from the document analysis area to at least a reject bin or a shuttle; and a gate that directs the document to the reject bin or the shuttle based on a result from the document analysis area. A pair of platen is housed within the shuttle and is moveable between an open position and a closed position. The second document delivery system creates a stack of the document within the shuttle while the pair of platen is in the open position; and the shuttle is configured to travel on a track system from a dock location to a user interface location and from the user interface location to the dock location. The shuttle may have a substantially vertical orientation at the dock location compared to a ground level of the automated transaction machine and the shuttle may be in a substantially horizontal orientation at the user interface location compared to the ground level.

BRIEF DESCRIPTION OF THE DRAWINGS

FIG. 13 is a first isometric view of the core module of the automated transaction machine of FIG. 1;

FIG. 14 is a second isometric view of the core module of FIG. 13;

FIG. 15 is a third isometric view of the core module of FIG. 13;

DETAILED DESCRIPTION

Figure 1:
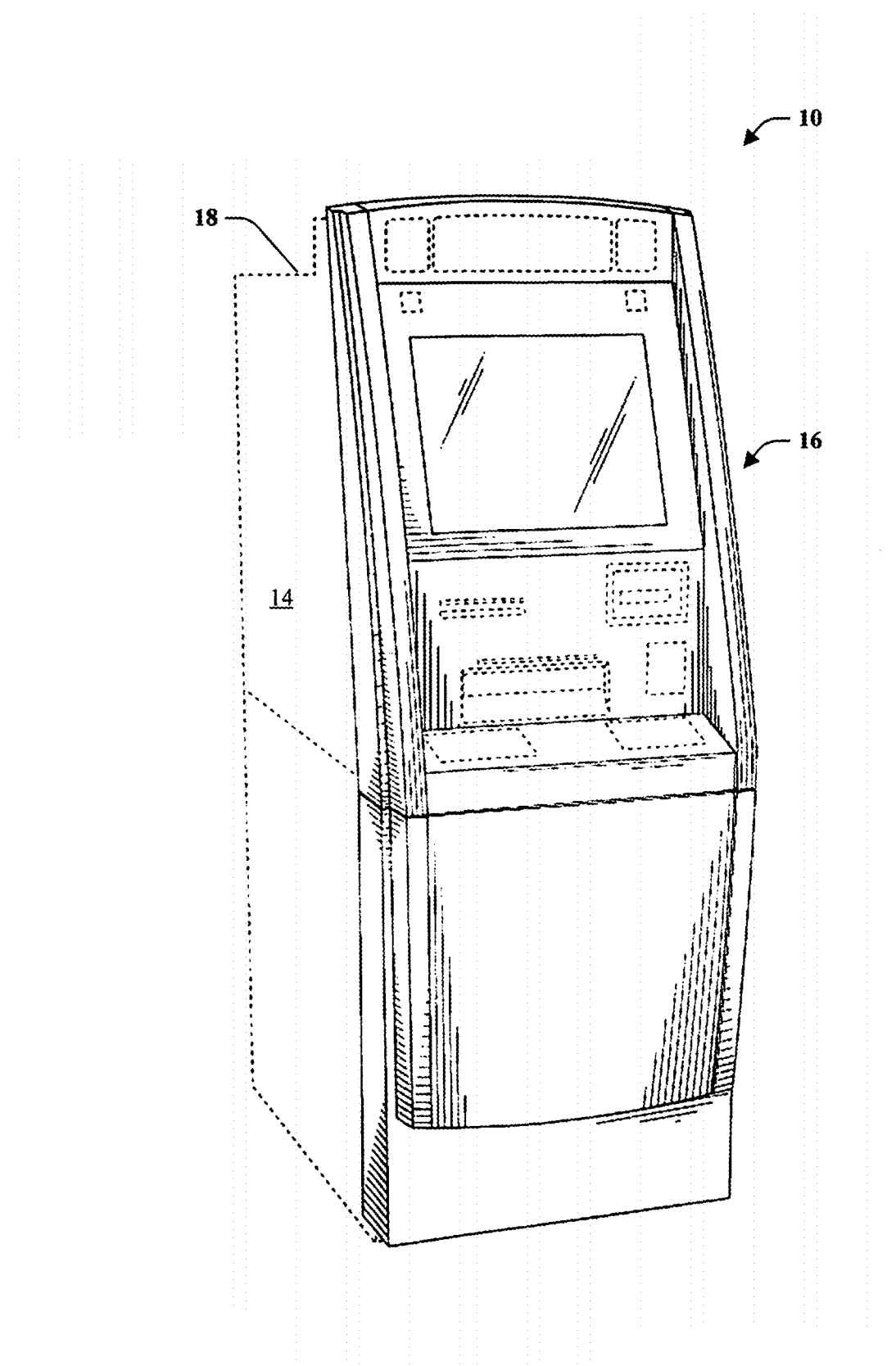
FIG. 1 is perspective view of an automated transaction machine of an exemplary embodiment.

In certain embodiments of an Automated Transaction Machine (ATM), a shuttle receives a stack of documents. The shuttle is moveable between a dock location to a user interface location along a track system The shuttle may be utilized with a rear-load configuration or a front-load configuration in which the track system has a travel path between the dock location to the user interface location.

With reference to the drawings, like reference numerals designate identical or similar corresponding parts throughout the several views. However, the inclusion of like elements in different views does not mean that any particular embodiment necessarily includes any such element or that any particular embodiment necessarily includes all such elements.

The term "document", as used herein, is to include currency, checks, bills, receipts, tickets, paper, and/or any other type of document that may be used with an Automated Transaction Machine (ATM). A document may be comprised of any material suitable to be handled inside the Automated Transaction Machine, such as, but not limited to, paper, paper with ink (e.g., black, color, etc.), recycled paper, thermal paper, impact paper, 2-ply paper, inkjet paper, and others. In certain embodiments, a document may have a height of approximately 60 mm to 85 mm, a length of approximately 120 mm to 185 mm, and a thickness of approximately 0.05 mm to approximately 0.2 mm. The document may have a top edge, a bottom edge opposite the top edge, a front, a back opposite the front, a left edge, a right edge opposite the left edge. It is to be appreciated that, based on a Country of origin for example, the document can include varying height that corresponds to numeric denominations or other uses.

The term "document analysis area" as used herein, is intended to include any location in an automated transaction machine where a document is analyzed for authenticity, quality, denomination, number of document(s), or any other characteristic of the document. The analysis may be performed by capturing an image of a portion of the document, capturing and evaluating an indicia on the document, capturing a video of the portion of the document, scanning a serial number, identifying an indicia on the document, and/or a combination thereof.

The term "controller", as used herein, any piece of or portion of hardware, or software, or any piece or portion of logic, or a combination thereof. The piece or portion of hardware may include at least a processor and a portion of memory, and the memory includes an instruction to execute. The term "component", as used herein, is generally any piece or portion of hardware of the Automated Transaction Machine that, wholly or in part, performs a function of the Automated Transaction Machine.

Further, it should be noted that certain terms used herein, such as "upper", "lower", "middle", "upward", "downward", "top", "bottom", "front", "back", "side", and the like, are used to facilitate the description of the embodiment(s) illustrated in the accompanying figures. Unless otherwise specified or made apparent by the context of the discussion, such terms should be interpreted as intended merely to facilitate the description of the features under discussion. Such terms are not intended as a limitation on the orientation in which components exist or may be used.

Figure 2:
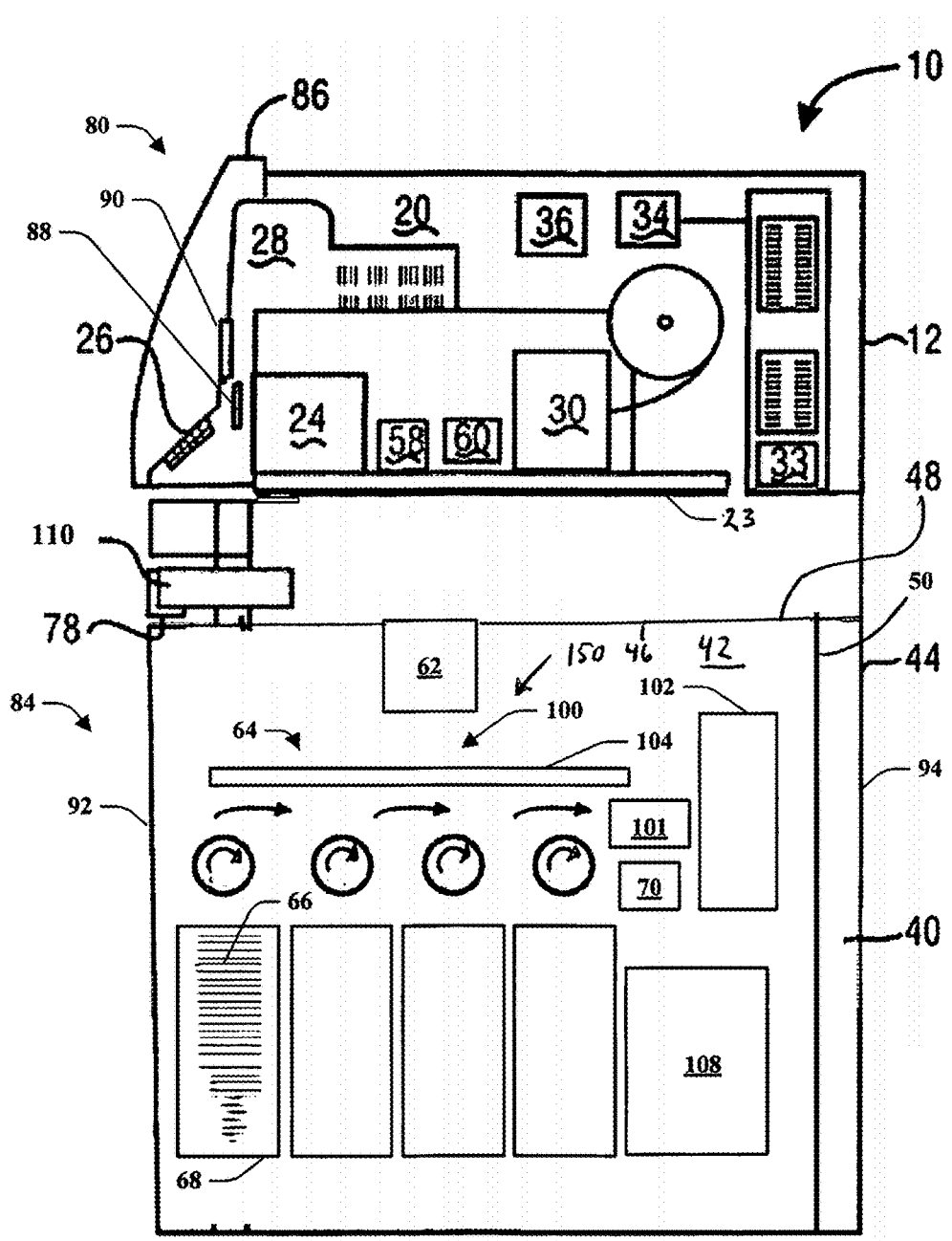
FIG. 2 is a side schematic view of the automated transaction machine of FIG. 1 shown in a rear-load configuration.
Figure 3:
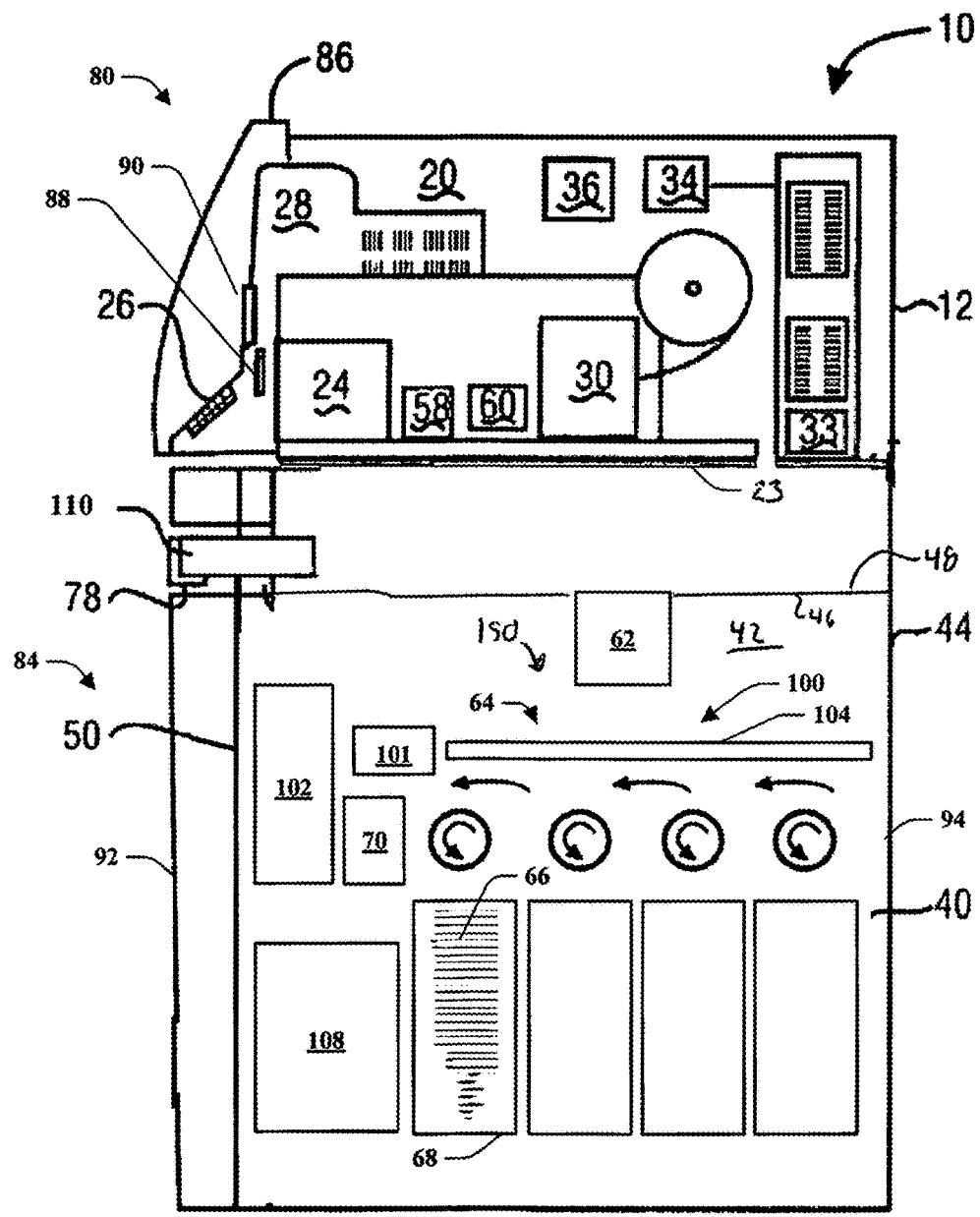
FIG. 3 is a side schematic view of the automated transaction machine of FIG. 1 shown in a front-load configuration.

Referring now to the drawings, and particularly to FIGS. 1-3, there is illustrated an automated transaction machine (ATM) 10 of a first exemplary embodiment. FIG. 1 illustrates the machine 10 in a perspective view. FIG. 2 illustrates a cross-sectional view of the machine 10, where the machine 10 is a rear-load configuration. FIG. 3 illustrates a cross-sectional view of the machine 10, where the machine 10 is a front-load configuration.

The ATM 10 includes a top housing 12 having side walls 14 and 16, and a top wall 18. The housing 12 encloses an interior area indicated at 20. The housing 12 has a front opening 110. In this exemplary embodiment, the rear of the housing 12 is closed by a rear wall. However, in other embodiments, the rear of the housing 12 may be accessible through an access door or similar device. The top housing 12 is used to house certain machine components such as, but not limited to, input devices, and output devices, among others.

Generally, the ATM 10 is an automated device that can dispense documents, receive documents, communicate with a financial institution, and communicate with a user, among others. It is to be appreciated and understood that the ATM 10 may be a stand-alone unit (as depicted), partly incorporated into a structure (e.g., interior wall, exterior wall, structure associated with a drive-in access system, structure associated with a walk-up system, and the like), among others. Additionally, the machine 10, as illustrated, includes an upper section (generally indicated at 80 in FIGS. 2 and 3) and a lower section (generally indicated at 84 in FIGS. 2 and 3), although such is not required. The upper section 80 and the lower section 84 can include various components, modules, and the like. In particular, the lower section 84 can include a core module 150.

With particular reference to FIGS. 2 and 3, the input devices include a card reader schematically indicated at 24. The card reader 24 is operative to read a customer's card that includes data thereon. For example, the indicia on the card may correspond to information about the customer and/or information about a customer's financial account, such as, but not limited to, the customer's account number. In some embodiments, the card reader 24 is a card reader adapted for reading magnetic stripe cards, RFID cards, chip enabled cards, and/or any combination thereof.

Another input device in the exemplary embodiment includes input keys 26. The input keys 26 may be arranged in a keypad or keyboard. The input keys 26 may alternately or in addition include function keys or other types of devices for receiving manual inputs. It must be understood that in various embodiments other types of input devices may be used such as biometric readers, speech or voice recognition devices, inductance type readers, IR type readers, touch screens, and other devices capable of communicating with a person, article or computing device, radio frequency type readers and other types of devices which are capable of receiving information that identifies a customer and/or their account.

The illustrated exemplary embodiments of the machine 10 also include output devices providing outputs to the customer. In the exemplary embodiments, the machine 10 includes a display 28, where display 28 can be, but is not limited to being, an LCD, CRT and/or other type display that is capable of providing visible indicia to a customer. In other embodiments, output devices can include devices such as audio speakers, RF transmitters, IR transmitters, Wi-Fi devices or other types of devices that are capable of providing outputs which may be perceived by a user either directly or through use of a computing device, article, or machine. It must be understood that certain embodiments also include combined input and output devices, such as a touch screen display, that are capable of providing outputs to a user as well as receiving inputs.

The exemplary embodiment of the automated transaction machine 10 also includes a receipt printer schematically indicated at 30, although such is not required. The receipt printer is operative to print receipts for users reflecting transactions conducted at the machine. Embodiments can also include other types of printing mechanisms such as statement printer mechanisms, ticket printing mechanisms, check printing mechanisms and other devices that operate to apply indicia to media in the course of performing transactions carried out with the machine 10.

The automated transaction machine 10 further includes one or more processors schematically indicated at 33. The processor 33, alternately referred to as a computer or a controller, is in operative connection with at least one memory or data store, which is schematically indicated at 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 can be one or more of a plurality of types of devices that enable the machine 10 to communicate with other systems and devices for purposes of carrying out transactions. For example, the communications device 36 may include a modem for communicating messages over a data line or wireless network, with one or more other computers that operate to transfer data representative of the transfer of funds in response to transactions conducted at the machine 10. Alternately, the communications device 36 can include various types of network interfaces, line drivers or other devices suitable to enable communication between the machine 10 and other computers and systems.

The exemplary ATM 10 further includes a safe or chest 40 enclosing a secure area 42. The secure area 42 is used in the exemplary embodiment to house critical components and/or valuable documents. Specifically, in the exemplary embodiment, the secure area 42 is used for housing currency, currency dispensers, currency stackers, and other machine components. For purposes of this disclosure, a cash dispenser shall include any mechanism that makes currency stored within the machine accessible from outside the machine.

The chest 40 includes a chest housing 44 including a top wall 46 having an upper surface 48 outside of the secure area 42. The top housing 12 is supported on the chest 40 such that the secure area 42 is generally below the interior area 20.

The chest 40 further includes a chest door 50 that is moveably mounted in supporting connection with the housing 12. The chest door 50 can be in a closed position or in an open position and can be generally closed to secure the contents of the chest 40. In other embodiments the chest opening and door may have other configurations. In the exemplary embodiment, the chest door 50 can include a first device opening (not shown) therethrough and cooperates with mechanisms inside and outside the chest for passing currency or other items between a customer and devices located inside the chest 40.

In still another embodiment, the chest door 50 can be opened to allow a portion of the secure area 42 to be a lower rollout tray (not shown) to access a portion thereof. For example, the lower rollout tray can be used to insert/remove cassettes or cartridges 68 into the machine 10.

Referring again to FIGS. 2 and 3, the machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine 10.

Exemplary automated transaction machine 10 further includes a plurality of actuators schematically indicated at 60 and 62 respectively. The actuators may comprise a plurality of devices such as motors, solenoids, cylinders, rotary actuators and other types of devices that are operated responsive to the processor 33. It should be understood that numerous components within the automated transaction machine 10 are operated by actuators positioned in operative connection therewith. Actuators 60 and 62 are shown to schematically represent such actuators in the machine 10 and to facilitate understanding.

The machine 10 further includes at least one dispenser mechanism 64 housed in secure area 42. The dispenser mechanism 64 is operatively responsive to the processor 33 to pick documents from a stack of documents 66 housed in one or more canisters which may be alternatively referred to herein as cassettes or cartridges 68. The dispenser mechanism 64 includes a first document delivery system 100 that transports the document from the cartridge 68 to a document analysis area 101 via a first transport path 104. It is noted and must be understood that the document analysis area 101 may lie along the first transport path 104, lie along a subsequent transport path, or be separate from the transport path. After being analyzed by the document analysis area 101 or passing through the document analysis area 101, the document may be collected or passed along. The picked documents may be arranged in a stack by an accumulator mechanism 70 in a shuttle 102, where the shuttle is moveable to deliver the stack of documents to a customer at an opening 110. If the document(s) are to be discarded after the analysis at the document analysis area 101, the document(s) are directed to a retract/reject bin 108. It is to be appreciated that the retract/reject bin 108 can include a first compartment for rejected documents and a second compartment for retracted documents. Moreover, it is to be appreciated that there can be one or more bins or compartments within bins for designation of the placed document(s).

In response to operation of the processor 33, when a desired number of document(s) have been collected in a stack, the stack is moved through the opening 110 via the shuttle 102 and, in particular, via a belt system, for example, coupled to one or more platen within the shuttle 102.

As the stacks are delivered through the opening 110, the controller 32 operates a suitable actuating device to operate a gate 78 so as to enable the stack of document(s) to pass outward through the opening 110. As a result, the user is enabled to receive the documents from the machine 10. After a user is sensed as having removed the stack from the opening, the controller 32 can operate to close the gate 78 so as to minimize the risk of tampering with the machine 10. If a pre-defined duration of time passes, the shuttle can return to a user interface location and direct the document or stack to the retract/reject bin 108.

With reference to FIGS. 2 and 3, in this exemplary embodiment, the ATM 10 further includes an optional upper rollout tray 23. The upper rollout tray 23 is moveably mounted in supporting connection with slides. The slides enable movement of the upper rollout tray 23 between the extended position and a retracted position within the interior area 20 of the top housing 12. The upper rollout tray 23 may have several upper machine components supported thereon including card reader 24, input keys 26, display 28, receipt printer 30, and other components as appropriate for the particular ATM 10.

This exemplary embodiment further includes an upper fascia 86 in supporting connection with the upper rollout tray 23. The upper fascia 86 may include user interface openings such as a card opening 88 through which a customer operating the machine 10 may insert a credit, debit or other card, or a receipt delivery slot 90 through which printed transactions receipts may be delivered to the customer. The upper rollout tray 23 moveably supports upper fascia 86 relative to the top housing 12 so that upper fascia 86 is movable between a first position covering the front opening and a second position in which the upper fascia is disposed from the front opening.

As illustrated in FIGS. 1-3, in the operative condition of the ATM 10, the upper rollout tray 23 is retracted into the interior area 20 of the housing 12. The upper fascia 86 operates to close front opening and provide an attractive appearance for ATM 10, while allowing a customer to input information and receive outputs from ATM 10. Moreover, the lower rollout tray (not shown) of the secure area 42 is in a retracted position into the secure area 42 of the machine 10.

The cartridge(s) 68 can be inserted from a front of the machine 10 indicated at 92 in which the front 92 is opposite to a rear of the machine 10 indicated at 94. Such a load configuration can be referred to as a "front-load" automated transaction machine 10. In such a front-load configuration, the cartridges 68 can be loaded via the lower rollout tray (not shown) that slides in and out of the secure area 42. It is to be appreciated and understood that the cartridge(s) 68 can be inserted from a rear of the machine 10 indicated at 94. Such a load configuration can be referred to as a "rear-load" automated transaction machine 10. In such a rear-load configuration, the cartridges 68 can be loaded via the lower rollout tray (not shown) that slides in and out of the secure area 42.

The first document delivery system 100 can transport, via the first transport path 104, a document from at least one cartridge 68 to the document analysis area 101. The document analysis area 101 can analyze certain aspects of the documents and/or capture an image of the document. Based on one or more parameters of the machine 10, the document can be transported from the document analysis area 101 to either a retract/reject bin 108 or to a shuttle 102. The transport of the document from the document analysis area 101 can be via a second document delivery system 106, see FIGS. 4, and 5. A gate 112 can direct the document either to the shuttle 102 or the retract/reject bin 108 based on a parameter detected by the document analysis area 101. By way of example, the parameter can be at least one of a detection of a misfeed, detection of more than one document, detection of a counterfeit document, an error or a fault of the machine 10, a non-capturing of an image of the document, among others.

The retract/reject bin 108 can include a first section that receives documents that are rejected and a second section that receives documents that are retracted.

It is to be appreciated that the first document delivery system 100, the second document delivery system 106, and/or additional document delivery systems can include various components, mechanical devices, and electronics such as, but not limited to, feed rollers, belt drives, belts, axles, shafts, drive shafts, platen, rollers, plates, gears, and the like. It is to be understood that various techniques can be employed to transport the document from a first location to a second location either within the machine 10 or to an exterior of the machine 10. Moreover, it is to be appreciated that two or more document delivery systems can be employed with the subject innovation and/or two or more transport paths can be employed with the subject innovation.

The document analysis area 101 is a location within the automated transaction machine 10 that can analyze certain aspects and/or capture an image of a portion or an area of the document. The first document delivery system 100 can transport a document from the cartridge 68 to the document analysis area 101 and the second document delivery system 106 can transport the document from the document analysis area 101 to another location (e.g., retract/reject bin 108, shuttle 102, among others). In the occurrence of image capture, in order to capture an image of the document, an unobstructed line of sight of the document is necessary which translates into the document analysis area being free of feeder rolls, belts, and/or any other components used with a document delivery system. By way of example and not limitation, the document analysis area 101 can include one or more scan components, positioned in an area that has an unobstructed line of sight, that are configured to capture an image of the document or a portion of the document.

Figure 4:
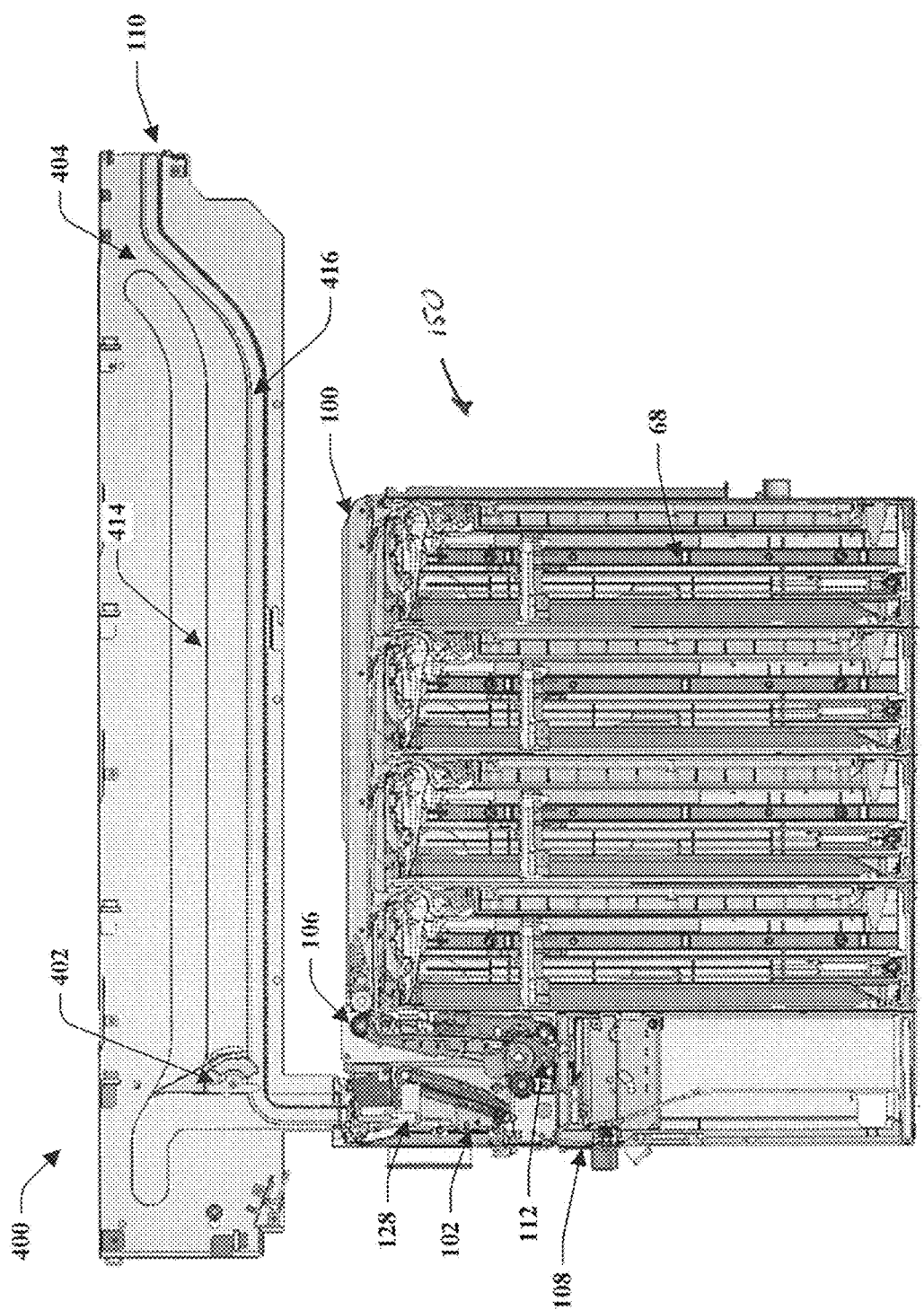
FIG. 4 is a cross-sectional view of the core module of the automated transaction machine of FIG. 2 with a rear-load track system.
Figure 5:
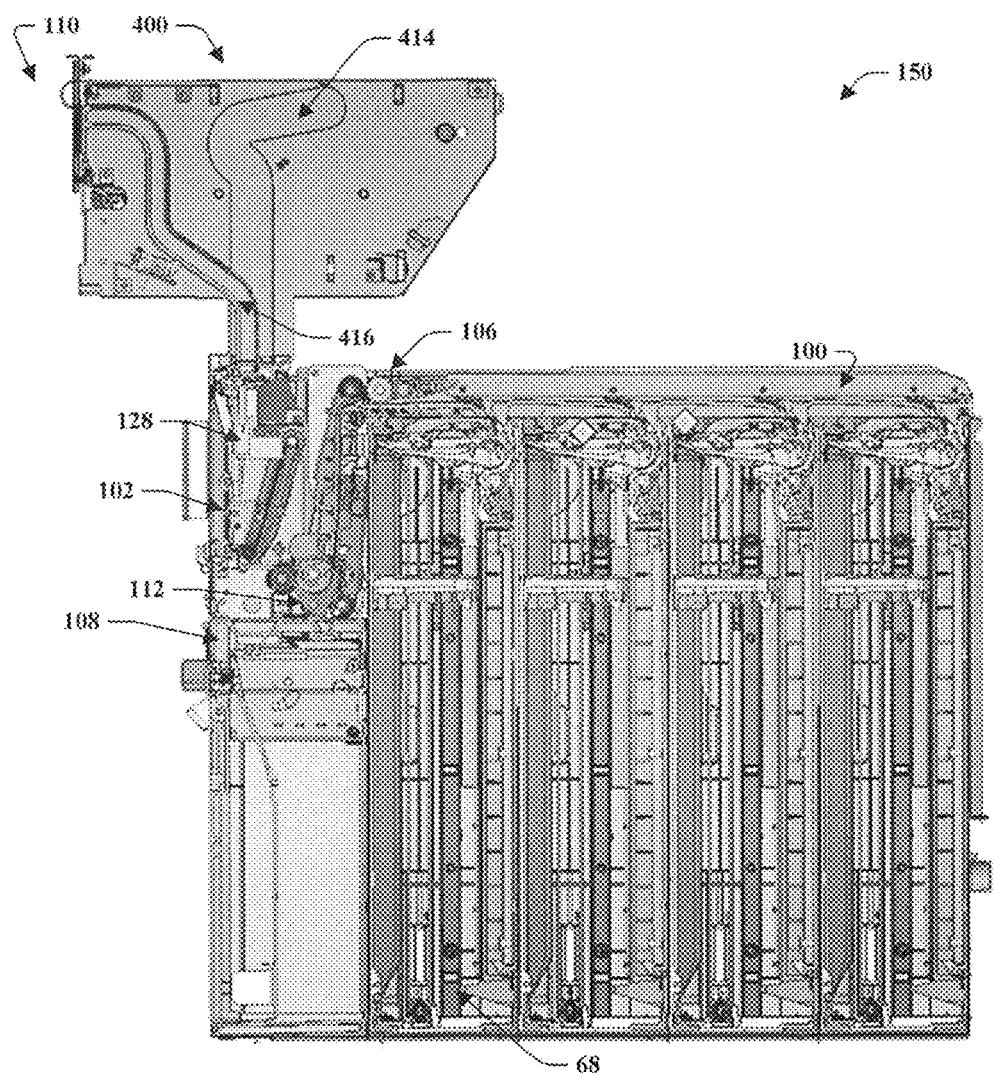
FIG. 5 is a cross-sectional view of the core module of the automated transaction machine of FIG. 3 with a front-load track system.

FIGS. 4-5 are cross-sectional views of the core module 150 of the machine 10, where the core module 150 is a front-load configuration in FIG. 5 and the core module 150 is a rear-load in FIG. 4. The core module 150 is connected to a track system 400. The track system 400 can include a junction switch 402 that allows the shuttle 102 to travel from a dock position (as illustrated) at a dock location to a delivery position 404 at user interface location 126 at opening 110.

The automated transaction machine 10 includes the following: the cartridge 68 that stores a document; a first document delivery system 100 that transports the document from the cartridge 68 to a document analysis area 101; a second document delivery system 106 that transports the document from the document analysis area 101 to a shuttle 102; a pair of platen 114 are housed within the shuttle 102 and are moveable between an open position (illustrated in FIG. 10) and a closed position (illustrated in FIG. 11), where the second document delivery system 106 (see at least FIGS. 4, 5, 8, and 9) creates a stack of the document within the shuttle 102 while the pair of platen 114 are in the open position; the shuttle 102 being configured to travel on a track system 400 from a dock location to a user interface location 126 at delivery position 404 and from the user interface location 126 at delivery position 404 to the dock location. The shuttle 102 may be in a substantially vertical orientation at the dock location compared to a ground-level of the automated transaction machine 10 and the shuttle 102 may be in a substantially horizontal orientation at the user interface location 126 at delivery position 404 compared to the ground-level. The shuttle 102 includes a first tracking idler 406, a second tracking idler 408 opposite the first tracking idler 406, a first gear 410, and a second gear 412 opposite the first gear 410. The track system 400 includes the following: a first channel 413 in which the first tracking idler 406 is moveable; a second channel 414 opposite the first channel 413, where the second channel 414 is in which the second tracking idler 408 is moveable; a third channel 415 in which the first gear 410 is moveable; a fourth channel 416 opposite the third channel 415, where the fourth channel 416 is in which the second gear 412 is moveable; and a junction switch 402 (also shown in FIGS. 24-25) that directs the shuttle 102 from a first path of travel to a second path of travel when a portion of the first channel 413 or second channel 414 overlap with portion of the third channel 415 or fourth channel 416.

Figure 6:
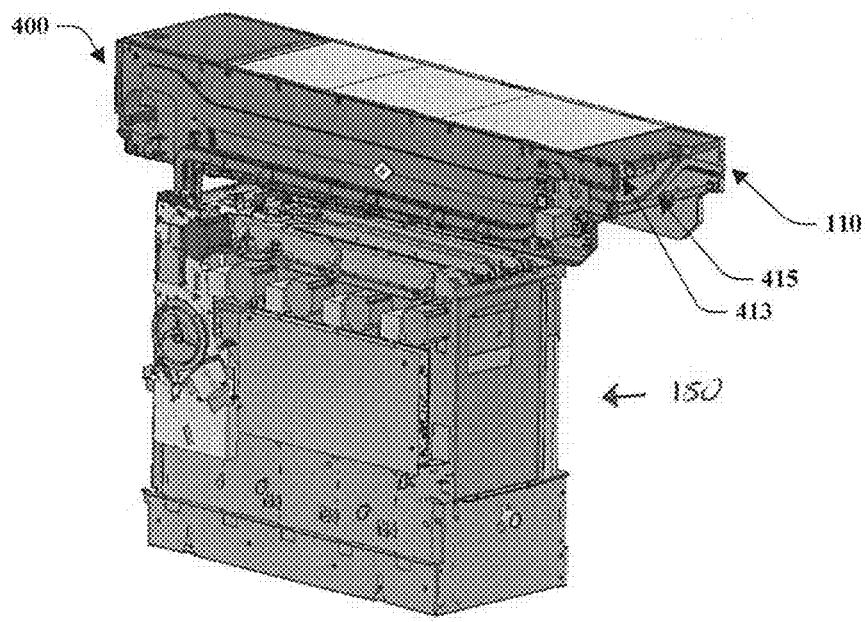
FIG. 6 is a top-front isometric view of the core module of FIG. 4.

FIG. 6 is a top-front perspective view of the core module 150 of the machine 10.

Figure 7:
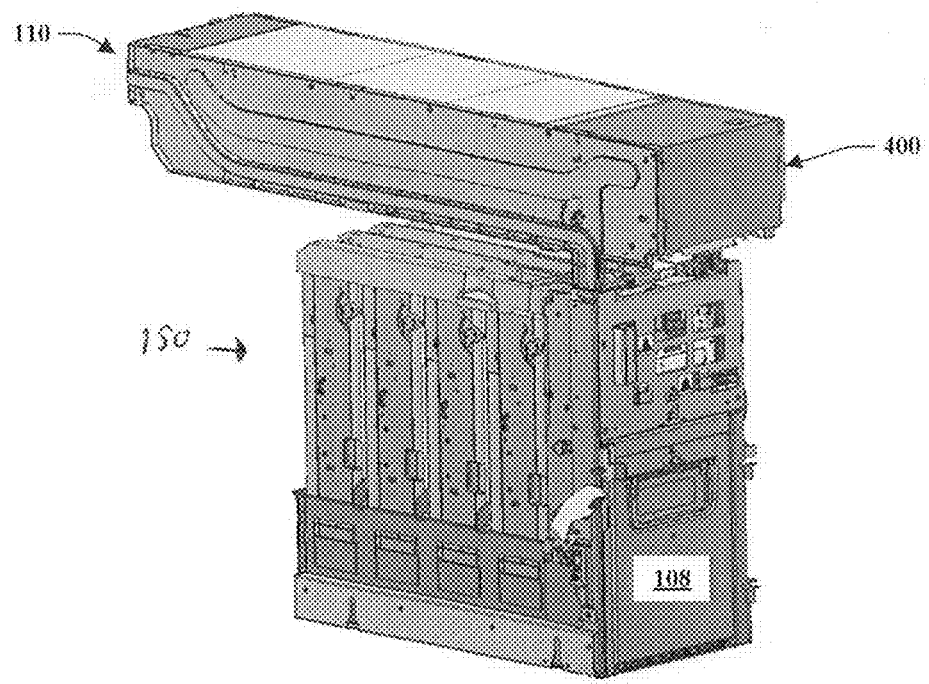
FIG. 7 is a top-rear isometric view of the core module of FIG. 4.

FIG. 7 is a top-rear perspective view of the core module 150 of the machine 10.

Figure 8:
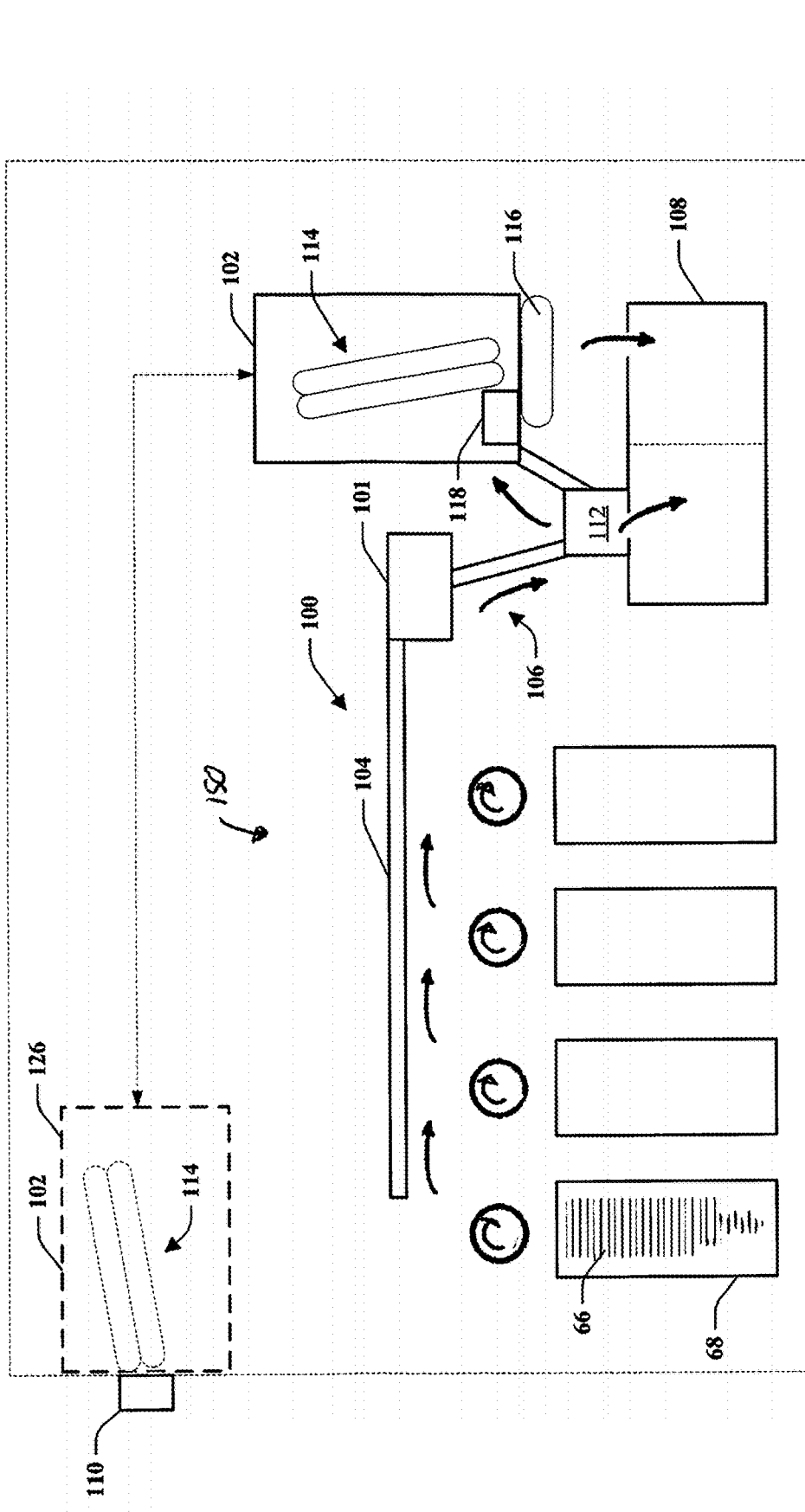
FIG. 8 is a schematic diagram of the core module of FIG. 4.
Figure 9:
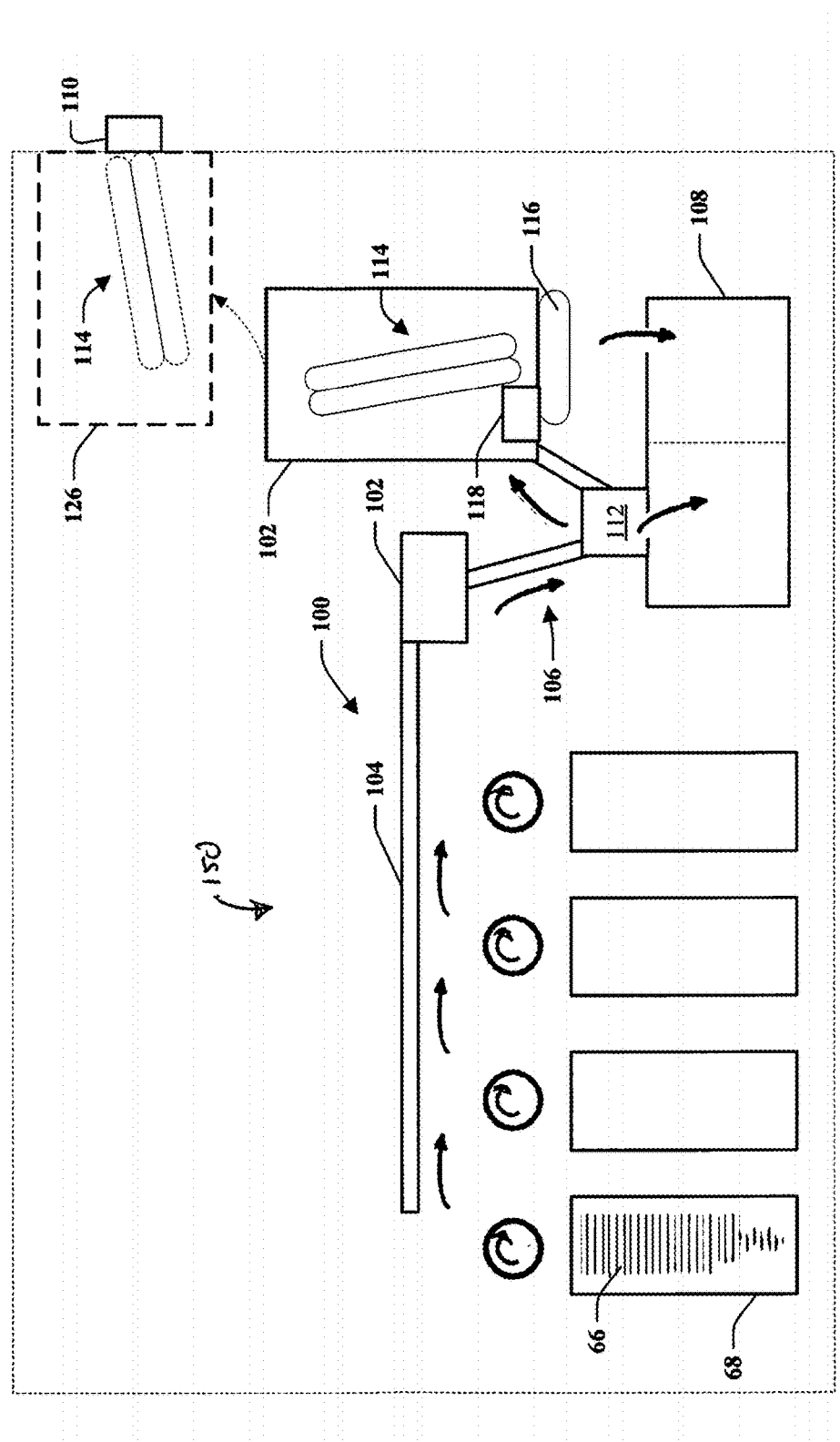
FIG. 9 is a schematic diagram of the core module of FIG. 5.

Turning to FIGS. 8 and 9, the core module 150 is illustrated, where FIG. 8 illustrates a rear-load configuration and FIG. 9 illustrates a front-load configuration. The document can be transported from the cartridge 68 to the document analysis area 101 via the first document delivery system 100. The second document delivery system 106 can transport the document from the document analysis area 101 to the shuttle 102 or the retract/reject bin 108 via the gate 112. The document can be diverted to the retract/reject bin 108 based on the evaluation of the document at the document analysis area 101. If the document meets or exceeds the requirements for the document analysis area 101, the document can be transported to the shuttle 102 with the second document delivery system 106. The documents can be stacked into the shuttle 102. Within the shuttle 102, the documents are delivered such that a bottom of the document is on a floor 116 and a front side and a back side is in-between the pair of platen 114, when the pair of platen 114 are in an open position (illustrated in at least FIG. 10).

Figure 10:
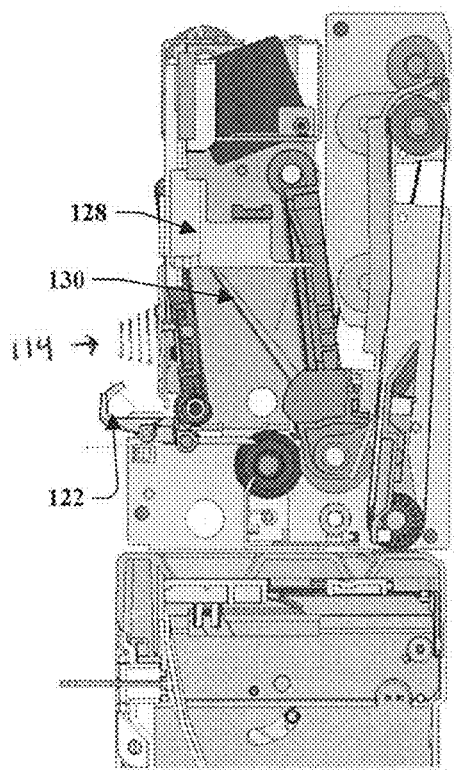
FIG. 10 is a cross-sectional view of the shuttle of the automated transaction machine of FIG. 1 in an open position.
Figure 11:
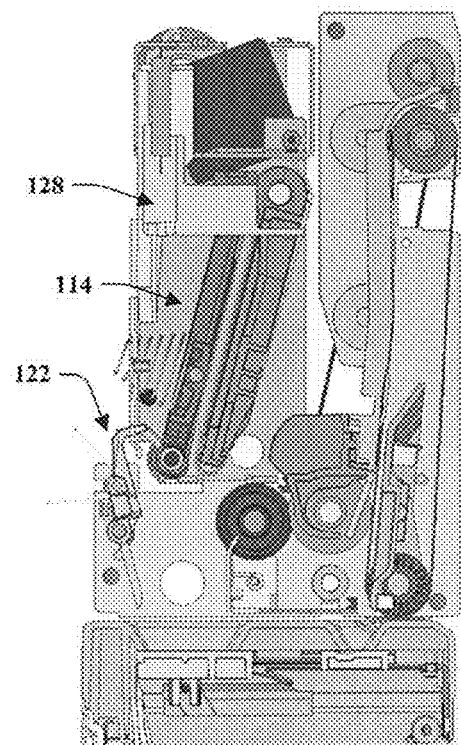
FIG. 11 is a cross-sectional view of the shuttle of FIG. 10 in a closed position.

In an embodiment, the pair of platen 114 is moveable between an open position (shown in FIG. 10) and a closed position (shown in FIG. 11). The open position is such that the pair of platen 114 is separated to allow a stack to be created. Upon creation of the stack, the pair of platen can move to a closed position in which the stack is pinched (e.g., pressure or force is applied to the pair of platen 114). In particular, one or more belts can be used with the pair of platen 114 to pinch the stack of document(s). The one or more belts can be further used to move the stack to the customer through the opening 110. In another embodiment, the belts or platen can provide a force to the document or stack while the shuttle 102 is moving. Additionally, the one or more belts can "jitter" or move in a direction (e.g., forward and back) the document or stack to alert the customer.

It is to be appreciated that the pair of platen 114 can be moveable, one of the pair of platen 114 can be moveable, or a combination thereof. Moreover, the pair of platen 114 can be moveable between various positions from the pair of platen 114 touching and engaged to the pair of platen 114 separated by a distance. For instance, a first distance can be used while creating a stack, a second distance can be used when a stack is being transported via the shuttle 102, and a third distance can be used when the shuttle 102 is idle (e.g., no stack being created, no transport of stack, etc.).

Figure 12:
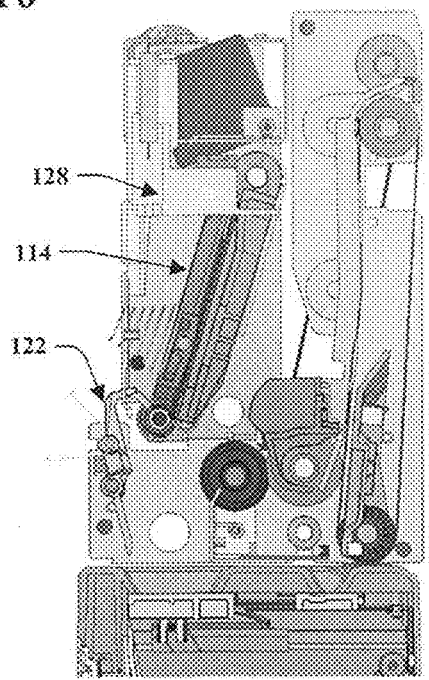
FIG. 12 is a cross-sectional view of the shuttle of FIG. 10 in a locked position.

The pair of platen 114 can be moveable between the closed position and the open position, wherein a separator member 120 (shown in FIGS. 19 and 23) and is driven by a camshaft in a first direction to separate the pair of platen 114. The camshaft can further drive a movement of the floor 116. Still further, the camshaft can drive a movement of a lock mechanism (shown in at least FIGS. 10-12,) for the shuttle 102, wherein the lock mechanism refrains movement of the shuttle 102 based on one or more arms 122 (shown in at least FIGS. 10-12,) engaging an aperture 124 on the shuttle 102. The shuttle 102 is depicted in a home position or rest position and locked in FIG. 12.

The shuttle 102 may include a light pipe system 118 that is configured to detect a defect with a stack created within the shuttle 102 (an in particular on the floor 116). In an embodiment, the light pipe system 118 can be integrated into the floor 116. By way of example and not limitation, the light pipe system 118 can include an emitter and a detector, in which a signal from the emitter is transmitted through one or more light pipes and received by the detector. Based on the received signal, a defect of the stack or the document can be detected. For instance, the defect can be, but is not limited to, a gap with the stack, a gap with the document, a debris, a skew of the stack, a thickness of the stack, among others.

If a defect is detected with the light pipe system 118, the shuttle 102 can dispense the stack or the document into the retract/reject bin 108. This can be an efficient manner to remove a defect stack or defect document as the retract/reject bin 108 is directly below the shuttle 102 and no travel of the shuttle 102 is required. The pair of platen 114 can move to the open position and the floor 116 can be opened to the retract/reject bin 108 and the defect stack or defect document can be placed therein.

The shuttle 102 can include a media shuttle sensor. The media shuttle sensor can be configured to detect at least one document in-between the pair of platen, debris in-between the pair of platen, or an absence of a document in-between the pair of platen. The machine 10 can utilize the media shuttle sensor to determine whether a foreign document is placed into the shuttle 102 or whether a stack has been removed after the shuttle 102 is in the delivery position. If the media shuttle sensor detects foreign debris or documents or documents that are retracted, the shuttle 102 can place such items into the retract/reject bin 108. Moreover, a note stop (discussed in more detail below) can be moved in order to shake loose debris or documents from the shuttle 102. The movement of the note stop can be performed during various points of operation of the core module 150 such as, but not limited to, return from a delivery position, prior to creating a stack, after a detection of a defect, among others.

FIG. 8 illustrates the core module 150 in a rear-load configuration in which the shuttle 102 moves from a home position or dock position at a dock location to a delivery position 404 at a user interface location 126. The shuttle 102 can be configured to travel on the track system 400 from a dock location to the user interface location 126 and from the user interface location 126 to the dock location, wherein the shuttle is in a substantially vertical orientation at the dock location compared to a ground-level of the automated transaction machine and the shuttle is in a substantially horizontal orientation at the user interface location compared to the ground-level.

In the illustrated rear-load configuration (FIG. 8), the shuttle 102 can move vertically in which the bottom swings toward the opening 110 and then the shuttle travels horizontally in which the bottom of the shuttle 102 is presented to the opening 110 such that the document or stack is presented to the customer.

In the illustrated front-load configuration (FIG. 9), the shuttle 102 can move vertically in which the bottom swings toward the opening 110 such that the document or stack is presented to the customer.

Each of the front-load configuration and the rear-load configuration, the track system 400 can be utilized in which each configuration can have a designated track with channels in which the shuttle is driven/guided. Thus, each of the front-load configuration and the rear-load configuration can have a respective travel path from the dock location at the home or dock position to the user interface location 126 at delivery position 404.

The illustrated core module 150 is adaptive to either a front-load configuration or a rear-load configuration, wherein the customization is the travel path and/or the track system 400. In particular, the shuttle 102 can utilize one or more sensors to detect the configuration upon startup. This allows for interchangeable parts for either the front-load configuration or the rear-load configuration.

By way of example, a sensor system that can be configured to detect a position of the shuttle on the track system, the sensor system including a first sensor positioned at the dock location and a second sensor positioned at the user interface location. The sensor system is utilized to identify a travel path for the shuttle on the track system. For instance, a first sensor can be placed at the dock location at the home or dock position and a second sensor can be placed at the delivery position, wherein a magnet is placed on the shuttle 102 and detection of the magnet indicates a type of dock configuration.

Moreover, the core module 150 can be configured to handle documents having two or more heights that correspond to denominations. Documents can have varying sizes in which a size corresponds to a denomination in countries outside the United States. In a front-load configuration, the core module 150 can stack documents such that the smaller height documents are stacked first. This allows for the stack to be presented to the customer with the smaller height documents on top of the larger height documents.

In a rear-load configuration, the core module 150 can sort the stack in which a threshold is used to determine the height difference allowed when stacking the documents. For instance, a height threshold of 6 mm can be used in which case a first document stacked may not be larger in height than 6 mm. The height threshold can be utilized in order to maintain a consistent stacking technique within the shuttle 102 (e.g., using the paddles, bower arms, note stop, etc.). It is to be appreciated that the threshold can be pre-defined or set based on the documents loaded into the cartridge 68.

Turning to FIGS. 10-11, a cross-sectional view of the shuttle 102 and a portion of the second document delivery system 106 are illustrated. The shuttle 102 further including a note stop 128 (also shown in FIGS. 4 and 5), that is in-between the pair of platen 114 and is adjustable to a height of the document, wherein the note stop 128 controls a top edge of the document when received by the second document delivery system 106. The shuttle 102 can include one or more bower arm 130 that directs a top portion of a backside of the document to one of the pair of platen 114. The shuttle 102 can further include one or more paddles that directs a bottom portion of the backside of the document to the one of the pair of platen 114.

FIGS. 13-15 illustrate a perspective view of the core module 150.

Figure 16:
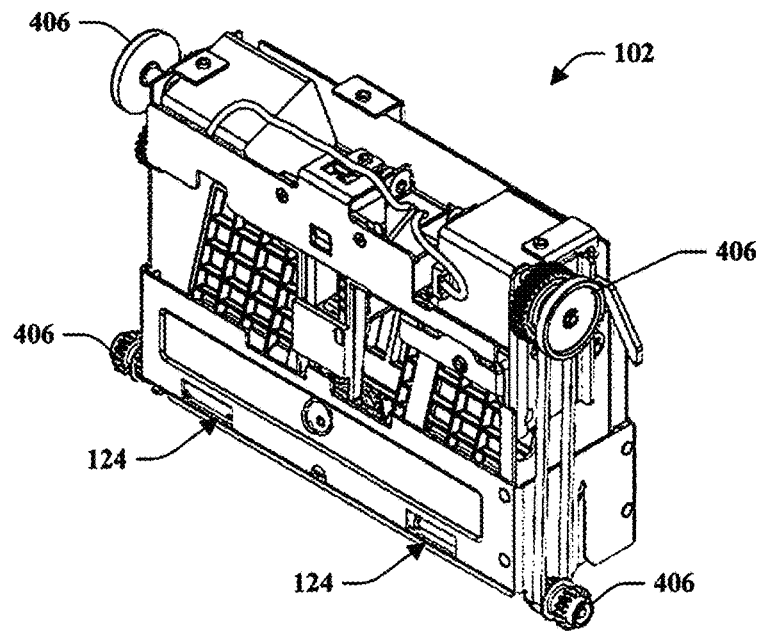
FIG. 16 is a first perspective view of the shuttle of FIG. 12.
Figure 17:
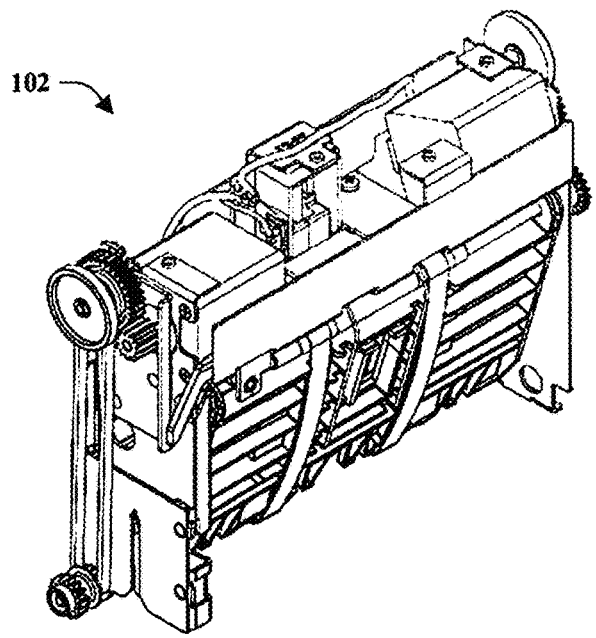
FIG. 17 is a second perspective view of the shuttle of FIG. 16.

FIGS. 16-17 illustrate a perspective view of the shuttle 102.

Figure 18:
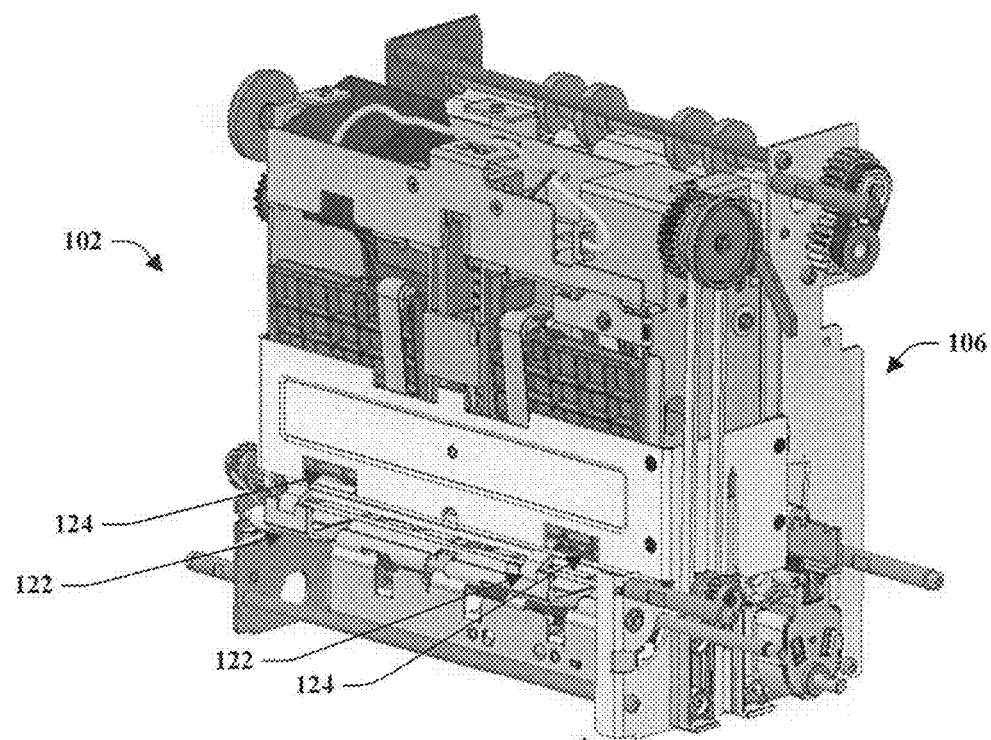
FIG. 18 is an isometric view of the shuttle of FIG. 12 engaged with a portion of a second document delivery system.

FIG. 18 illustrates the shuttle 102 engaged with a portion of the second document delivery system 106.

Figure 19:
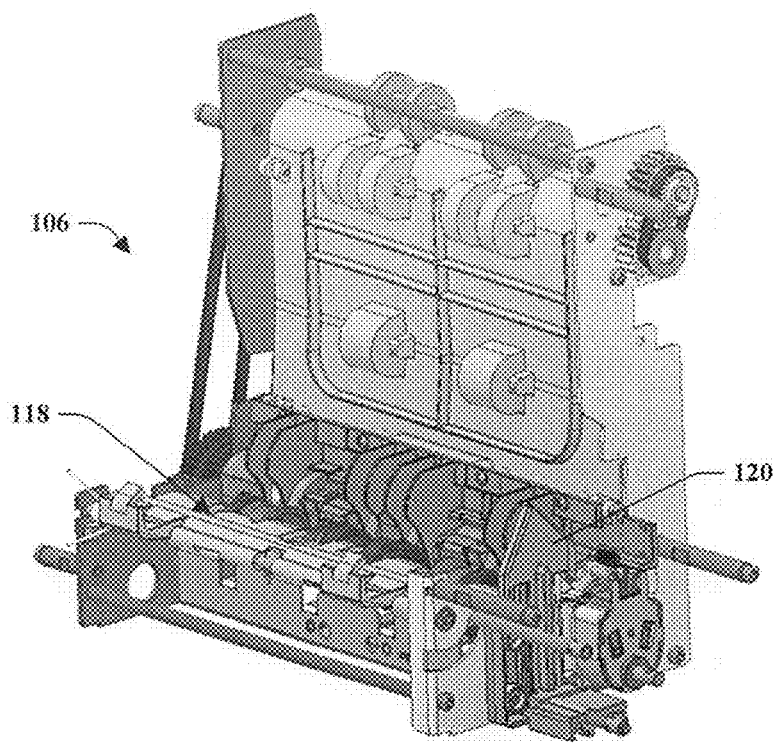
FIG. 19 is an isometric of the portion of a second document delivery system of FIG. 18 with the shuttle removed.

FIG. 19 illustrates a portion of the second document delivery system 106.

Figure 20:
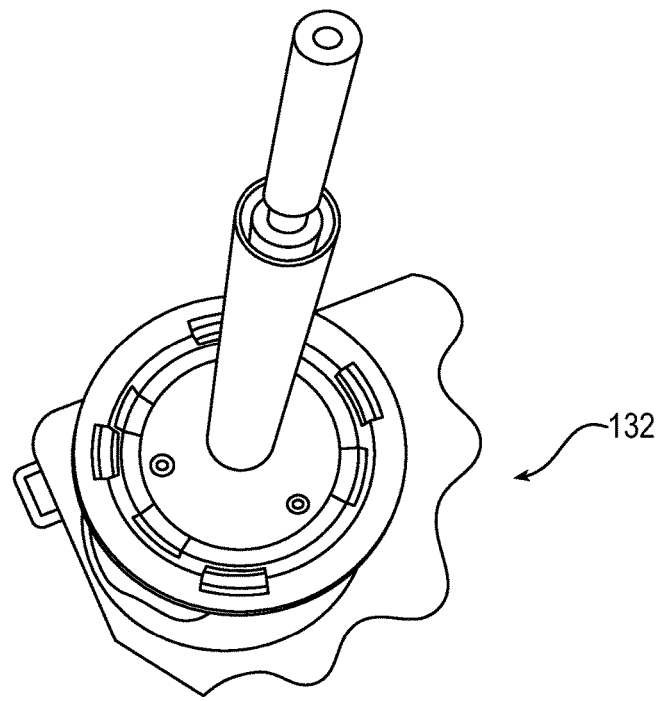
FIG. 20 is a perspective view of a spool system that houses a cable used to provide electrical communications between the shuttle and another component of the automated transaction machine of FIG. 1.

FIG. 20 illustrates a spool system 132 that houses a cable used to provide electrical communications between the shuttle 102 and the core module 150. The spool system 132 can house the cable such that the cable is retractable from the spool system 132 when the shuttle 102 is traveling between the dock location and the user interface location; and the cable is wound in a circle about an axis of the spool system 132 in which a diameter of the circle decreases based on a distance the cable is retracted from the spool system 132.

Figure 21:
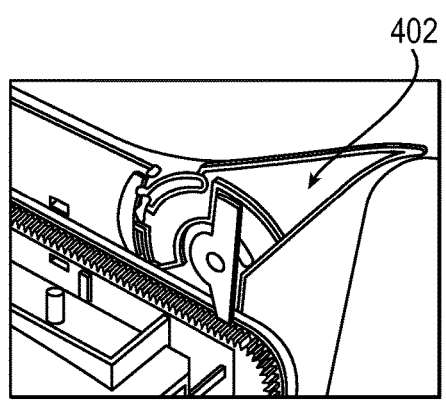
FIG. 21 is a partial perspective view of a junction switch used with the track system for the shuttle for the automated transaction machine of FIG. 1.
Figure 22:
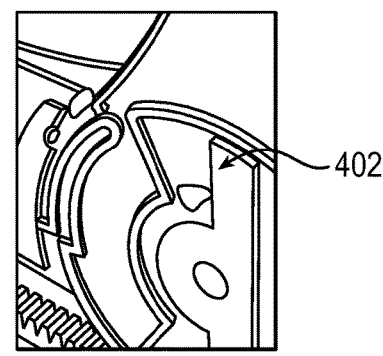
FIG. 22 is an enlarged perspective view of a portion of the junction switch of FIG. 21.

FIGS. 21-22 illustrate a junction switch used with a track system for the shuttle 102.

Figure 23:
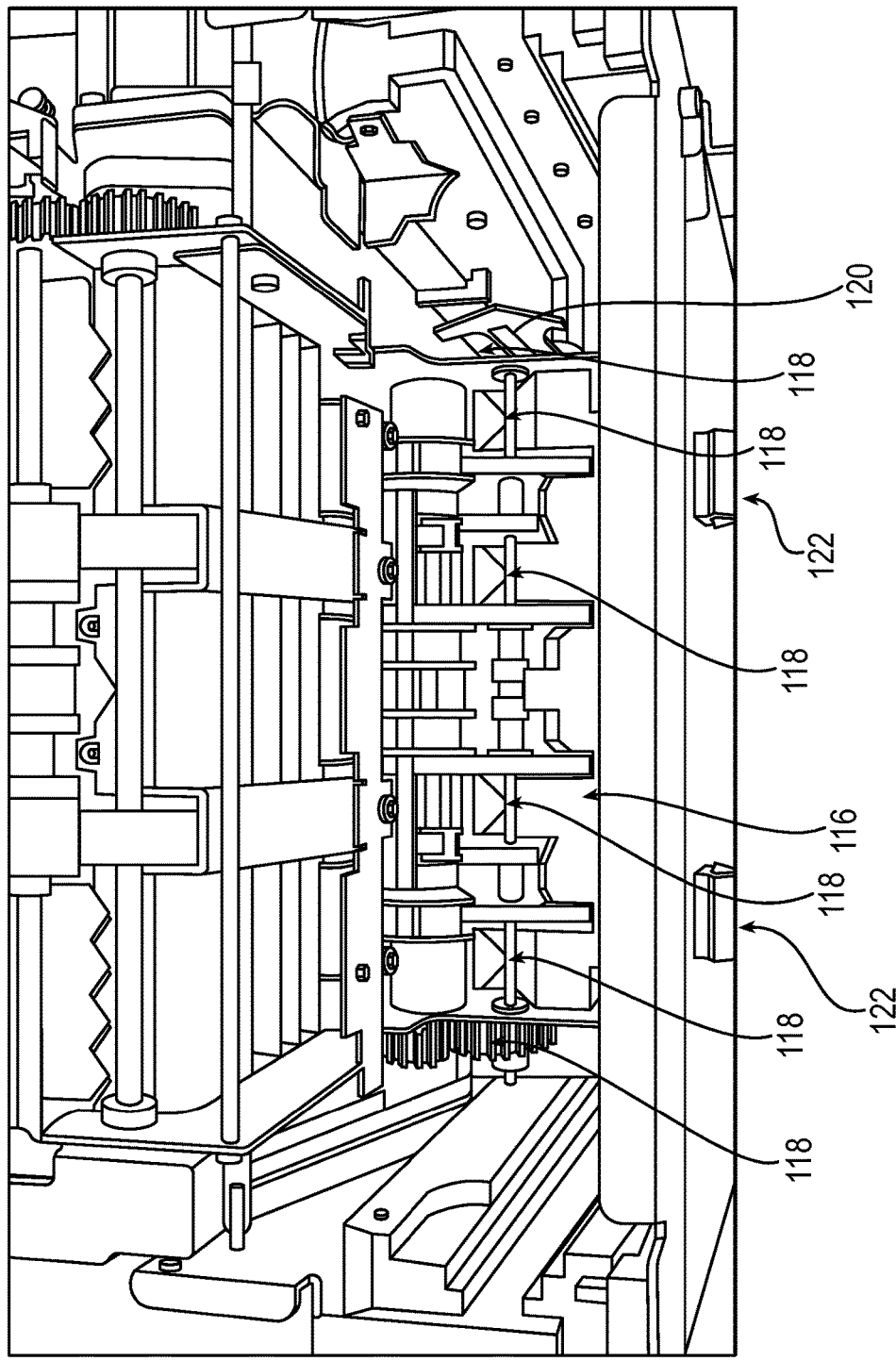
FIG. 23 is a top perspective view of a portion of the second document delivery system of FIG. 18.

FIG. 23 illustrates a top-view of a portion of the second document delivery system 106.

In an embodiment, a camshaft can drive a spreader in-between the pair of platen for movement between the open position and the closed position.

In an embodiment, the shuttle further includes a media shuttle sensor that is configured to detect at least one of the document in-between the pair of platen, a debris in-between the pair of platen, or an absence of the document in-between the pair of platen. In the embodiment, the media shuttle sensor detects the debris in-between the pair of platen and the shuttle further includes a note stop that is in-between the pair of platen and is adjustable to a height of the document. In the embodiment, the pair of platen are moved to the open position and note stop is moved to remove the debris into the reject bin.

In an embodiment, a light pipe sensor system is provided at an entry point of the shuttle from the second document delivery system and is configured to detect a defect with the stack. In the embodiment, the pair of platen are moved to the open position to remove the stack into the reject bin upon detection of the defect.

The aforementioned systems, devices, applications, modules, components, (e.g., controller, processor, first document delivery system 100, second document delivery system 106, document analysis area 101, shuttle 102, pair of platen 114, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

What is claimed is:

1. An automated transaction machine, comprising:
a track system extending between a dock location and a user interface location:
a shuttle configured to travel on the track system between the dock location and the user interface location, the shuttle including a pair of platen housed within the shuttle that is moveable between an open position and a closed position;
a cartridge for storing a document;
a first document delivery system;
a second document delivery system, the first document delivery system capable of transporting a document between the cartridge and the second document delivery system via a first transport path, the second document delivery system capable of transporting a document between the first document delivery system and the dock location via a second transport path, and and, where the second document delivery system is operable to one of place or withdrawal a document within the shuttle while the pair of platen are in the open position.

2. The automated transaction machine of claim 1 further comprising:
a document analysis area along the first transport path or between the first transport path and the second transport path.

3. The automated transaction machine of claim 1 further comprising:
a gate disposed along the second transport path and proximate the dock location; and
a reject bin disposed proximate the gate,
where the gate is operable to direct a document traveling along the second transport path to either the shuttle or the reject bin.

4. The automated transaction machine of claim 3 further comprising:
a document analysis area along the first transport path or between the first transport path and the second transport path,
where the gate is operable to direct a document traveling along the second transport path to either the shuttle or the reject bin based upon an indication from the document analysis area.

5. The automated transaction machine of claim 3, further comprising:
a light pipe sensor system at an entry point of the shuttle from the second document delivery system configured to detect a defect with the stack, and
where the pair of platen is moved to the open position to remove the stack into the reject bin upon detection of the defect.

6. The automated transaction machine of claim 1 where when at the dock location the shuttle is in a substantially vertical orientation relative to a ground-level of the automated transaction machine and the shuttle is in a substantially horizontal orientation at the user interface location compared to the ground-level.

7. The automated transaction machine of claim 6 where when at the user interface location the shuttle is in a substantially horizontal orientation relative to a ground-level of the automated transaction machine.

8. The automated transaction machine of claim 1 where when at the user interface location the shuttle is in a substantially horizontal orientation relative to a ground-level of the automated transaction machine.

9. The automated transaction machine of claim 1, further comprising a camshaft that drives a spreader in-between the pair of platen for movement between the open position and the closed position.

10. The automated transaction machine of claim 1 where the shuttle further includes a media shuttle sensor that is configured to detect at least one of the document in-between the pair of platen, debris in-between the pair of platen, or an absence of a document in-between the pair of platen.

11. The automated transaction machine of claim 10 where the shuttle further includes a note stop that is in-between the pair of platen and is adjustable to a height of the document.

12. The automated transaction machine of claim 1 further comprising:
a lock mechanism capable of engaging at least one aperture in the shuttle to refrain movement of the shuttle when the shuttle is in one of the dock location or the user interface location.

13. The automated transaction machine of claim 1 further comprising:
a sensor system that is configured to detect a position of the shuttle on the track system, the sensor system including a first sensor positioned at the dock location and a second sensor positioned at the user interface location, where the sensor system is utilized to identify a travel path for the shuttle on the track system.

14. The automated transaction machine of claim 1 where the shuttle further includes a note stop that is in-between the pair of platen and is adjustable to a height of the document, wherein the note stop controls a top edge of the document when received into the shuttle; and
where the automated transaction machine further comprises:
a bower arm to directs a top portion of a backside of the document to one of the pair of platen; and
a paddle to directs a bottom portion of the backside of the document to the one of the pair of platen.

15. The automated transaction machine of claim 1 further comprising:
a spool system that retractably houses a cable is configured to provide electrical communication between a controller and the shuttle, where when the shuttle is traveling between the dock location and the user interface location the cable the cable is wound in a circle about an axis of the spool system in which a diameter of the circle decreases based on a distance the shuttle is from the spool system.

16. The automated transaction machine of claim 1 further comprising:
a light pipe sensor system that is configured to detect a defect with at least one document, the light pipe sensor system including:
one or more light pipe structures prior to an entry point of the shuttle;
an emitter that transmits a signal through the one or more light pipes;
a detector that receives the signal from the one or more light pipes; and
the light pipe sensor system detects the defect based on the receipt of the signal at the detector.

17. The automated transaction machine of claim 16, wherein the defect is at least one of a gap within a stack of documents, debris within a stack of documents, a skewness of a stack of documents, or a thickness of a stack of documents.

18. The automated transaction machine of claim 1 where the track system is of a rear-load configuration.

19. The automated transaction machine of claim 1 where the track system is of a front-load configuration.

20. The automated transaction machine of claim 1 where the shuttle includes a first tracking idler, a second tracking idler opposite the first tracking idler, a first gear, and a second gear opposite the first gear, and
where the track system includes:
a first channel in which the first tracking idler is moveable;

a second channel opposite the first channel, wherein the second channel is in which the second tracking idler is moveable;

a third channel in which the first gear is moveable;

a fourth channel opposite the third channel, wherein the fourth channel is in which the second gear is moveable; and a junction switch that directs the shuttle from a first path of travel to a second path of travel when a portion of the first channel and second channel overlap a portion of the third channel and fourth channel.

* * * * *